(12) United States Patent
Zhu et al.

(10) Patent No.: US 11,656,207 B2
(45) Date of Patent: May 23, 2023

(54) MATERIAL AND ITS METHOD FOR RAPID ELUTING IN AN IONIC RARE EARTH ORE LEACHING SITE

(71) Applicant: Tsinghua University, Beijing (CN)

(72) Inventors: Guocai Zhu, Beijing (CN); Husheng Hu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 305 days.

(21) Appl. No.: 17/099,972

(22) Filed: Nov. 17, 2020

(65) Prior Publication Data
US 2021/0215646 A1 Jul. 15, 2021

(30) Foreign Application Priority Data

Jan. 13, 2020 (CN) .......................... 202010031624.5

(51) Int. Cl.
| | | |
|---|---|---|
| *G01N 30/02* | (2006.01) | |
| *C22B 1/00* | (2006.01) | |
| *C22B 3/04* | (2006.01) | |
| *C22B 59/00* | (2006.01) | |

(52) U.S. Cl.
CPC .............. *G01N 30/02* (2013.01); *C22B 1/00* (2013.01); *C22B 3/04* (2013.01); *C22B 59/00* (2013.01); *G01N 2030/027* (2013.01)

(58) Field of Classification Search
CPC .... G01N 30/02; G01N 2030/027; C22B 3/04; C22B 59/00
See application file for complete search history.

(56) References Cited

U.S. PATENT DOCUMENTS 8,721,998 B2 * 5/2014 Huang .................... C22B 59/00
423/63

OTHER PUBLICATIONS

Xiao, Y., et al., "Reduction leaching of rare earth from ion-adsorption type rare earths ore with ferrous sulfate", Journal of Rare Earths, vol. 34, No. 9, pp. 917-923. (Sep. 2016).*

* cited by examiner

*Primary Examiner* — Benjamin L Lebron
(74) *Attorney, Agent, or Firm* — WPAT, PC

(57) ABSTRACT

The invention relates to a material and its method for rapidly eluting ammonium ions and soluble metal cations in an ionic rare earth ore leaching site, which comprises the following steps: 1) Ferrous sulfate is dissolved in water as an eluant; 2) Take the soil sample from the closed leaching site of ionic rare earth ore to make an eluting column, use the above-mentioned eluent to elute, more than 95% water-soluble and exchangeable ammonium ions in the soil sample are eluted, while more than 90% of the residual rare earths in the soil sample are exchanged into the eluent, which can quickly achieve the purpose of eluting ammonium ions in the leaching site and recovering the residual rare earths, and is beneficial to the soil remediation for the leaching site.

5 Claims, 1 Drawing Sheet

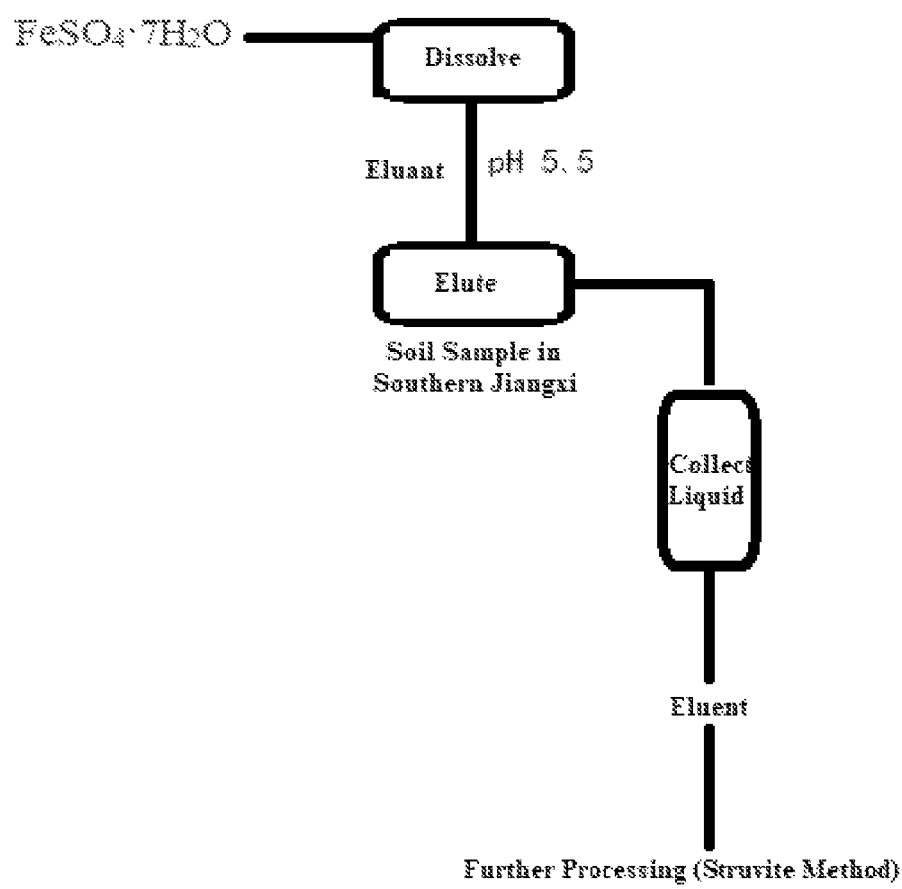

MATERIAL AND ITS METHOD FOR RAPID ELUTING IN AN IONIC RARE EARTH ORE LEACHING SITE

FIELD OF THE INVENTION

The invention belongs to the field of environmental protection technology.

BACKGROUND OF THE INVENTION

Ion adsorption type rare earth ore is a kind of mineral resource with very important strategic significance because it is rich in medium and heavy rare earth elements and can be used in high-tech fields such as electronic communication, aerospace and military. Ammonium sulfate is mainly used as leaching agent in ionic rare earth mining. Before 2007, pool leaching and heap leaching were mainly used, and then in-situ leaching process was fully used. During the mining of ionic rare earth ore, excessive ammonium ions are absorbed into the soil of the mining area. Some studies have found that the content of ammonia nitrogen in the surface soil of the mining site and its surrounding area can be as high as 0.97 kg/t during mining, and the content of ammonium nitrogen in 1cm-20 cm soil is still as high as 1.21 kg/t after three years of mine closure. It can be seen that the residual ammonia nitrogen in the mining area stays in the soil for a long time and it is difficult to digest and transform naturally.

Some of the ammonium ions on the surface soil of the ionic rare earth ore leaching site flow into the surrounding rivers through the surface runoff, while the ammonium ions inside the ore body leak into the groundwater along with the mother liquor; after the rare earth mining is completed, some of the ammonium ions remaining on the soil surface and the gaps in the mining area continue to enter the water body with the rain water under the leaching of rainfall. The study found that the concentration of ammonia nitrogen in the water body of the mining area is 110 mg/L in spring and 90 mg/L-160 mg/L in winter, even though the ammonium ions retained in the ore body are diluted by groundwater and surface water, which far exceeds the national secondary standards for sewage discharge, and some water bodies have deteriorated to class IV water quality. These residual ammonium ions can also be converted into nitrate under the action of microorganisms. If the human body drinks it for a long time, it will damage the health of human body. Meanwhile, the mining process of ionic rare earth ore will promote the plasma activation of associated heavy metals such as Cu, Cd, Zn and Pb, which will cause heavy metal pollution after they enter the water body.

In recent years, in order to remove ammonium ions from the ionic rare earth ore leaching site, Jiangxi South Rare Earth Group has conducted a clear water eluting—reverse osmosis membrane purification attempt in zudong mining area, the experiment was conducted for nearly a year, but the operation cost was high, the eluting time was long, the water consumption was large, and the removal effect of ammonium ions was not good, so it could not be promoted. It has also been proposed that the use of 250 mg/L neutral salt KCl solution for eluting can greatly reduce the amount of water. Acid and ammonium ions enter the eluent together, which can accelerate the elution of acid and ammonium ions compared with water eluting. However, only laboratory scale research has been conducted currently, and the price of potassium chloride is high, so whether it can be applied in practice requires further research. In recent years, South Rare Earth Group has conducted the industrialization practice of magnesium sulfate of eluting ammonia nitrogen in the leaching site, but the concentration of the eluant magnesium sulfate needs to be guaranteed to be more than 2%, and the consumption is large, which has no economic significance, while the pH value of eluant is controlled below 4, so the problem of soil acidification is still not solved; an attempt was made to use lime water for subsequent eluting to neutralize the acidity of the soil. It was found that lime and sulfate radical formed calcium sulfate precipitation, which blocked the soil pores of the leaching site and could not be applied in actual production. Therefore, it is of practical significance to study the economical and feasible materials and technologies in rapid eluting for the environmental governance of ionic rare earth ore leaching site.

SUMMARY OF THE INVENTION

The invention relates to a material and its method for rapid eluting in an ionic rare earth ore leaching site, mainly for environmental governance in an closed ore ionic rare earth ore in-situ leaching site, developing an economic and cheap material in rapid eluting, using the original liquid injection pipeline used during leaching, the eluant is injected into the contaminated leaching site to quickly elute the ammonium ions and acidic substances in the leaching site, while the rare earths will be further replaced for recycling. The original liquid collection system is used to collect and centrally process the eluent containing ammonium ions, acidic substances and rare earths.

The material and its method for rapid eluting of an ionic rare earth ore leaching site of the invention are realized through the following steps.

1) Weigh a certain amount of ferrous sulfate ($FeSO_4.7H_2O$) and dissolve it in water to prepare a 0.5-5 g/L solution, and adjust the pH4-6 of the solution as the eluant; the optimal concentration of the eluant is 3 g/L, pH=5.5;

2) Take the soil sample from the closed leaching site of ionic rare earth ore in southern Jiangxi to make an eluting column, and use the above-mentioned eluant to elute according to the ratio of eluant (ml)/soil sample (g)=1-5, the optimal eluting ratio is 4; take the sample at determined intervals to analyze the content of ammonia nitrogen and rare earths, after the eluting is completed, take the sample to analyze the content of ammonia nitrogen and rare earths in the soil sample in the eluting column.

The method of the invention can realize the elution of more than 95% water-soluble and exchangeable ammonium ions in the soil sample in an ionic rare earth ore leaching site, while the replacement rate of the residual rare earths in the soil sample is also more than 90%.

BRIEF DESCRIPTION OF THE DRAWINGS

FIG. 1 is a schematic diagram of the technical route for the method of rapid eluting in an ionic rare earth ore leaching site.

DETAILED DESCRIPTION OF THE INVENTION

The following is a further detailed description in combination with the preferred embodiments shown in the drawings; specific embodiments are as follows:

Embodiment 1

Weigh 6 g of ferrous sulfate ($FeSO_4.7H_2O$) and dissolve it in 2 L of deionized water to obtain the eluant of pH=5.5;

take a soil sample of a closed ore rare earth ore leaching site in southern Jiangxi (sampling depth is 3-5 meters). After testing, the total content of ammonia nitrogen (NH3-N) in this soil sample is 286 mg/kg, the water-soluble and exchangeable ammonia nitrogen is 268 mg/kg, the fixed ammonia nitrogen is 18 mg/kg, and the content of rare earth (ΣRE) is 85 mg/kg; take 300 g of soil sample to make an exchange column, elute the exchange column with the above eluant, collect the eluent and analyze the content of ammonium ions and rare earths in the eluent. When the eluent is collected to 1,200 ml, the ammonia nitrogen and rare earths in the eluent are less than 1 mg/L, indicating that the eluting has been completed; after removing the soil sample from the eluting column and drying it, the content of ammonia nitrogen and rare earth (IRE) were analyzed to be 23 mg/kg and 4.3 mg/kg, respectively. The elution rate of water-soluble and exchangeable ammonia nitrogen was 98.1%, and the elution rate of residual rare earths was 94.9%.

Embodiment 2

Weigh 4 g of industrial grade ferrous sulfate (FeSO4.7H2O) and dissolve it in 2 L of running water to obtain the eluant of pH=5.5; take 300 g of soil sample in Embodiment 1 to make an exchange column, elute the exchange column with the new eluant, collect the eluent and analyze the content of ammonium ions and rare earths in the eluent. When the eluent is collected to 1,200 ml, the ammonia nitrogen and rare earths in the eluent are less than 1 mg/L, indicating that the eluting has been completed; after removing the soil sample from the eluting column and drying it, the content of ammonia nitrogen and rare earth (IRE) were analyzed to be 28 mg/kg and 5.5 mg/kg, respectively. The elution rate of water-soluble and exchangeable ammonia nitrogen was 96.3%, and the elution rate of residual rare earths was 93.5%.

The invention claimed is:

1. A method for eluting an ionic rare earth ore leaching site, comprising:
    weighing ferrous sulfate ($FeSO_4.7H_2O$) and dissolve the weighted ferrous sulfate in water to prepare a solution with a concentration in a range from 0.5 g/L to 5 g/L, and using one of sulfuric acid and alkali to adjust a PH value of the solution to be in a range from 4 to 6 to obtain an eluant; and
    taking a soil sample from the ionic rare earth ore leaching site in Jiangxi to make an eluting column, and using the eluent to elute the eluting column according to a ratio of the eluant (ml)/the soil sample (g) being in a range from 1 to 5 to obtain an eluted sample; taking the eluted sample at determined intervals to analyze contents of ammonia nitrogen and rare earths thereof; after the eluting is completed, re-taking the eluted sample to analyze contents of ammonia nitrogen and rare earths in the soil sample in the eluting column.

2. The method for eluting the ionic rare earth ore leaching site according to claim 1, wherein a raw material of the ferrous sulfate ($FeSO_4.7H_2O$) is industrial waste ferrous sulfate from titanium dioxide industry.

3. The method for eluting the ionic rare earth ore leaching site according to claim 1, wherein the concentration of the solution is 3 g/L, and the PH value of the solution is 5.5.

4. The method for eluting the ionic rare earth ore leaching site according to claim 1, wherein the ratio of the eluant (ml)/the soil sample (g) is 4.

5. The method for eluting the ionic rare earth ore leaching site according to claim 1, more than 95% water-soluble and exchangeable ammonium ions in the soil sample in the ionic rare earth ore leaching site are eluted, more than 90% of rare earths in the soil sample are exchanged in to the eluent.

* * * * *